United States Patent
McDonald et al.

(10) Patent No.: US 12,135,415 B2
(45) Date of Patent: Nov. 5, 2024

(54) ELECTROSTATIC ACTUATOR WITH 4-BIT DIGITAL ELECTRODE

(71) Applicant: TEXAS INSTRUMENTS INCORPORATED, Dallas, TX (US)

(72) Inventors: William Craig McDonald, Allen, TX (US); James Norman Hall, Parker, TX (US); Kelly Jay Taylor, Allen, TX (US); Song Zheng, Fairview, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 440 days.

(21) Appl. No.: 17/398,907

(22) Filed: Aug. 10, 2021

(65) Prior Publication Data
US 2022/0269067 A1 Aug. 25, 2022

Related U.S. Application Data

(60) Provisional application No. 63/152,179, filed on Feb. 22, 2021.

(51) Int. Cl.
*G02B 26/08* (2006.01)
*G02B 7/182* (2021.01)
*H02N 1/00* (2006.01)

(52) U.S. Cl.
CPC ......... *G02B 26/0816* (2013.01); *H02N 1/006* (2013.01)

(58) Field of Classification Search
CPC ............ G02B 26/0816; G02B 26/0833; G02B 26/0841; G02B 26/085; G02B 26/06; G02B 26/08; G02B 7/182; H02N 1/006; H02N 1/004; H02N 1/002; H02N 1/00
See application file for complete search history.

(56) References Cited

U.S. PATENT DOCUMENTS

| | | | | |
|---|---|---|---|---|
| 4,954,789 A | * | 9/1990 | Sampsell | G02B 26/001 359/318 |
| 5,508,841 A | * | 4/1996 | Lin | G02B 26/06 359/263 |
| 5,629,790 A | * | 5/1997 | Neukermans | G02B 26/0858 250/234 |
| 6,351,330 B2 | * | 2/2002 | Ko | G02B 26/0841 359/224.1 |

(Continued)

FOREIGN PATENT DOCUMENTS

| | | | | |
|---|---|---|---|---|
| CN | 101506713 A | * | 8/2009 | ......... G02B 26/0841 |
| CN | 110927960 B | * | 12/2020 | |

OTHER PUBLICATIONS

Bartlett et al., "Recent Advances In The Development Of The Texas Instruments Phase-Only Microelectromechanical Systems (MEMS) Spatial Light Modulator," Proc. SPIE 11698, Emerging Digital Micromirror Device Based Systems And Applications XIII, 116980O, Mar. 9, 2021, 14 p., plus Abstract.

*Primary Examiner* — Edgardo San Martin
(74) *Attorney, Agent, or Firm* — Michelle F. Murray; Frank D. Cimino

(57) ABSTRACT

A system includes a hinge structure. The hinge structure includes four support posts and four hinges, each hinge coupled to an edge of a support post and to a plate of the hinge structure, where each hinge includes two 90° turns. The system also includes a mirror coupled to the hinge structure and an electrode structure coupled to the hinge structure.

21 Claims, 11 Drawing Sheets

(56) References Cited

U.S. PATENT DOCUMENTS

| | | | | |
|---|---|---|---|---|
| 6,856,446 B2* | 2/2005 | DiCarlo | G02B 26/0841 |
| | | | 359/290 |
| 6,900,922 B2* | 5/2005 | Aubuchon | G02B 26/0841 |
| | | | 359/290 |
| 7,106,491 B2* | 9/2006 | Meyer | G02B 26/0841 |
| | | | 359/290 |
| 7,411,718 B2* | 8/2008 | Cho | G02B 26/0841 |
| | | | 359/290 |
| 7,447,891 B2* | 11/2008 | Faase | G02B 26/001 |
| | | | 359/290 |
| 7,488,082 B2* | 2/2009 | Kim | G09G 3/346 |
| | | | 359/872 |
| 7,629,725 B1* | 12/2009 | Knollenberg | G02B 26/06 |
| | | | 359/290 |
| 10,371,939 B2* | 8/2019 | McDonald | G02B 26/0841 |
| 11,256,083 B2* | 2/2022 | McDonald | H02N 1/006 |
| 2003/0214734 A1* | 11/2003 | Nishioka | G03B 17/17 |
| | | | 359/834 |
| 2006/0017689 A1* | 1/2006 | Faase | G02B 1/11 |
| | | | 345/108 |
| 2006/0119922 A1* | 6/2006 | Faase | G02B 26/001 |
| | | | 359/290 |
| 2013/0194651 A1* | 8/2013 | Srivastava | G02B 26/00 |
| | | | 359/290 |
| 2021/0181499 A1* | 6/2021 | Oden | H02N 1/006 |
| 2021/0215928 A1* | 7/2021 | Fruehling | G02B 26/06 |

* cited by examiner

ELECTROSTATIC ACTUATOR WITH 4-BIT DIGITAL ELECTRODE

CROSS-REFERENCE TO RELATED APPLICATIONS

The present application claims priority to U.S. Provisional Patent Application No. 63/152,179, which was filed Feb. 22, 2021, is titled "MEMS Electrostatic Actuator With 4-Bit Digital Electrode," and is hereby incorporated herein by reference in its entirety.

BACKGROUND

A phase light modulator (PLM) has an array of individually-addressable, digitally-controlled micromirrors that may be positioned at multiple discrete vertical positions. The micromirrors may move vertically by fractions of a wavelength of the light directed to the micromirrors. The phase of the light is modulated by moving the micromirrors up and down. Diffraction of the light causes constructive diffraction patterns that produce bright regions, and destructive diffraction patterns that produce dark regions. These light and dark regions may be used to produce images.

SUMMARY

In accordance with at least one example of the description, a device includes a hinge structure and a mirror coupled to the hinge structure. The device also includes an electrode structure coupled to the hinge structure. The electrode structure includes a first electrode at a center of the electrode structure and a second electrode surrounding the first electrode. The electrode structure also includes a third electrode surrounding the second electrode and a fourth electrode surrounding the third electrode.

In accordance with at least one example of the description, a system includes a hinge structure. The hinge structure includes four support posts and four hinges, each hinge coupled to an edge of a support post and to a plate of the hinge structure, where each hinge includes two 90° turns. The system also includes a mirror coupled to the hinge structure and an electrode structure coupled to the hinge structure.

In accordance with at least one example of the description, a system includes a PLM. The PLM includes a hinge structure. The hinge structure includes four support posts configured to support the hinge structure, each support post offset from a corner of the hinge structure. The hinge structure also includes four hinges, each hinge coupled to an edge of a support post and to a plate of the hinge structure, where each hinge includes a 90° turn. The PLM also includes a mirror coupled to the hinge structure, where the hinge structure is configured to adjust a position of the mirror. The PLM also includes an electrode structure coupled to the hinge structure. The PLM includes a static random access memory (SRAM) memory array coupled to the electrode structure, the SRAM memory array configured to provide a voltage to the electrode structure. The system also includes a light source configured to project light onto the PLM. The system also includes a controller coupled to the SRAM memory array.

DETAILED DESCRIPTION

Figure 1A:
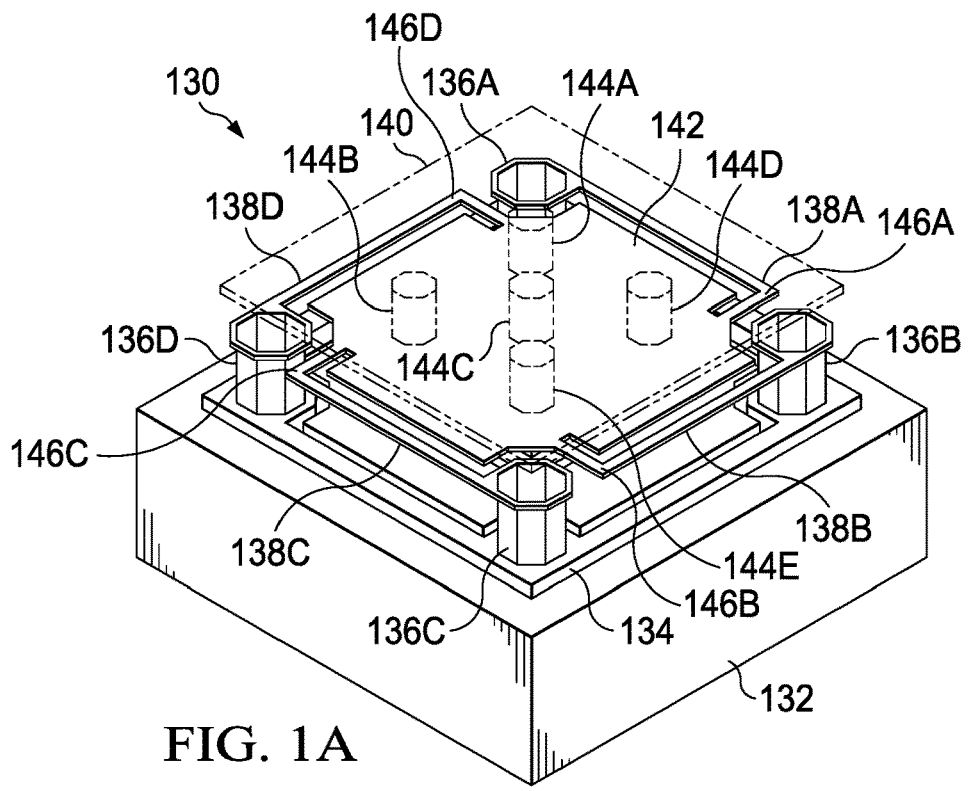
FIG. 1A is a perspective view of a 4-bit electrode design in accordance with various examples.

PLMs may be used for visible wavelength applications such as static or dynamic images, high dynamic range (HDR) video, virtual displays, augmented reality displays, and automobile headlights. In ultraviolet portions of the spectrum, PLMs may be used for lithography or three-dimensional (3D) printing. In infrared portions of the spectrum, PLMs may be used for telecommunications or ranging applications. PLMs modulate light by moving mirrors vertically to one of a series of discrete positions. In example systems, specific voltages may be applied to an electrode to cause the mirrors to move to one of the discrete positions. More specifically, voltages are applied to an electrode with three segments, which provides 3-bit digital addressing for the PLM. Therefore, each micromirror may be positioned at one of eight discrete positions ($2^3=8$) by selectively applying voltage to the three segments of the electrode. This process is referred to as 3-bit digital addressing. These systems may include a post and hinges that couple to a top plate and extend from a center of the post, with the hinges and the top plate being useful to move the micromirrors to each of the eight discrete positions. The 3-bit digital addressing in some systems limits the number of possible micromirror positions, which results in suboptimal diffraction efficiency and optical performance. Also, hinges that extend from the center of the post reduce the size of the top plate coupled to the hinges. Electrostatic force from the electrode moves the top plate and the micromirror, so a smaller top plate receives less electrostatic force than a larger top plate, and therefore has a reduced range of movement.

This disclosure describes various examples of a PLM electrode having four segments. Therefore, each micromirror can be positioned using 4-bit digital addressing, which increases the possible number of micromirror positions to 16 ($2^4=16$). The increased number of positions improves diffraction efficiency and optical performance compared to a system with 3-bit addressing. The 4-bit electrode design described herein also makes more efficient use of space compared to the 3-segment electrode by moving hinge positions outward from the center of the micromirror. Further, the 4-bit electrode design described herein includes process improvements that reduce the spacing between the four segments of the electrode, which increases the active electrode area. Further still, the 4-bit electrode design achieves approximate linearity between discrete micromirror positions over a larger number of the 16 positions than the 3-segment design. Linearity refers to the uniformity of the amount of vertical movement of the micromirror between each of the 16 positions.

In accordance with various examples herein, an offset hinge geometry is utilized in which the hinges are flexible beams that extend from an edge of the post instead of the center of the post, thereby providing additional area for interior electrodes between the hinges and beneath the micromirror. In accordance with some examples, each hinge has a second turn or angle that increases the length of the hinge and allows the hinge posts to be spaced further apart. Spacing the hinge posts further apart may introduce process improvements that create a flatter array of micromirrors, as described below. The second turn of the hinge increase hinge compliance and provide relief of hinge stresses for better thermal stability.

Examples with fewer mirror via posts are described, which may use one or four posts instead of five posts. The mirror via posts couple the micromirrors to the top plate, which is coupled to the hinges. These examples may reduce distortions from stress imbalances between process layers. A spacer thickness may be increased during manufacturing, which increases the amount of vertical movement that the micromirror may undergo, thereby providing a wider range of operation. Also, the gaps between the four electrodes may be reduced, which increases the active area of the electrode, allowing for greater electrostatic force to be applied to the micromirrors. Also, the gaps between adjacent micromirrors may be reduced, which may provide increased fill factor and may reduce diffraction losses. Fill factor is the ratio of the device surface that is covered by micromirrors. Large gaps between micromirrors reduce the fill factor, while smaller gaps increase the fill factor. A larger fill factor increases the amount of light reflected by the micromirrors.

A PLM in accordance with various examples herein may be used in a variety of applications. For example, the PLM may be used for an augmented reality heads-up display (HUD) in an automobile. The HUD may display various information to the driver or other passengers in the automobile. The PLM may be used for automotive headlights in another example. In another example, the PLM may be used for dynamic ground projection in an automobile. With dynamic ground projection, an image is projected onto the ground. The image may be a static or dynamic. One example of dynamic ground projection is an image projected onto the ground when an automobile door is opened, such as the logo of the automobile manufacturer or a moving image. In addition, status or service information regarding the automobile could be projected onto the ground or another surface. In another example, dynamic ground projection could be used for autonomous vehicles to project information to people outside of the vehicle. A pedestrian in a crosswalk may normally make eye contact with the driver of a vehicle to help determine if it is safe to enter the crosswalk. This is not possible with an autonomous vehicle without a driver. Therefore, the autonomous vehicle may project a visible image or message onto the ground near the car that indicates the vehicle is aware of the pedestrian and it is safe for the pedestrian to enter the crosswalk. Another application for the PLM is for high dynamic range (HDR) imaging.

The PLM could be paired with a digital micromirror device (DMD) to create HDR images.

In other examples, A PLM may be used for a head-mounted augmented reality or virtual reality display. PLMs may be used for light detection and ranging (LIDAR), with ultraviolet, visible, or infrared light. PLMs may be used for lithography or 3D printing using ultraviolet light. In infrared portions of the spectrum, PLMs may also be used for telecommunications.

A 3-bit electrode design has electrode segments that are individually addressed to provide eight discrete positions for the mirror, as described above. Examples herein have a 4-bit electrode design that provides sixteen discrete positions for the mirror. Examples of 4-bit electrode designs are shown in FIGS. 1A and 1B.

Figure 1B:
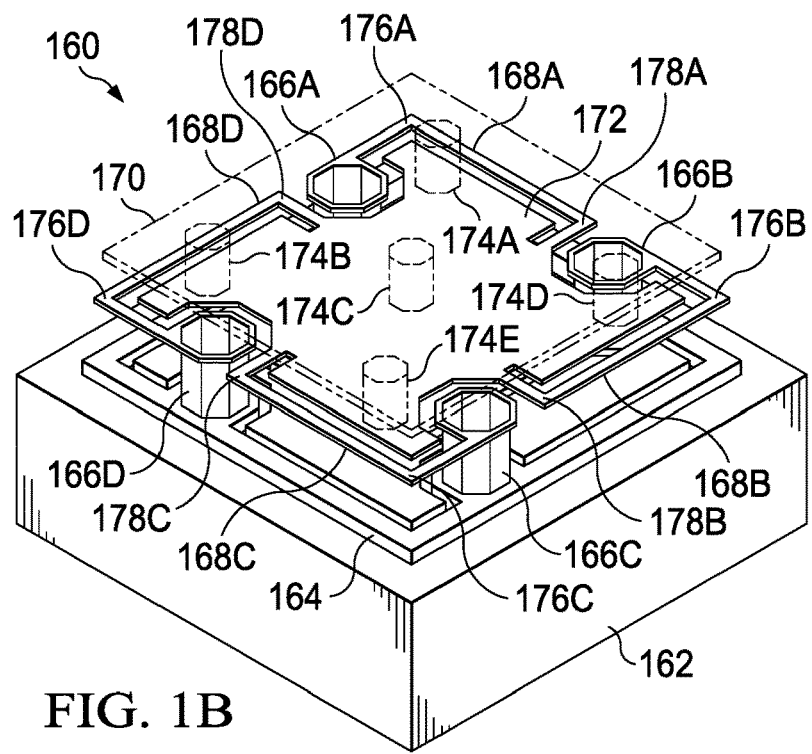
FIG. 1B is a perspective view of a 4-bit electrode design in accordance with various examples.
Figure 2:
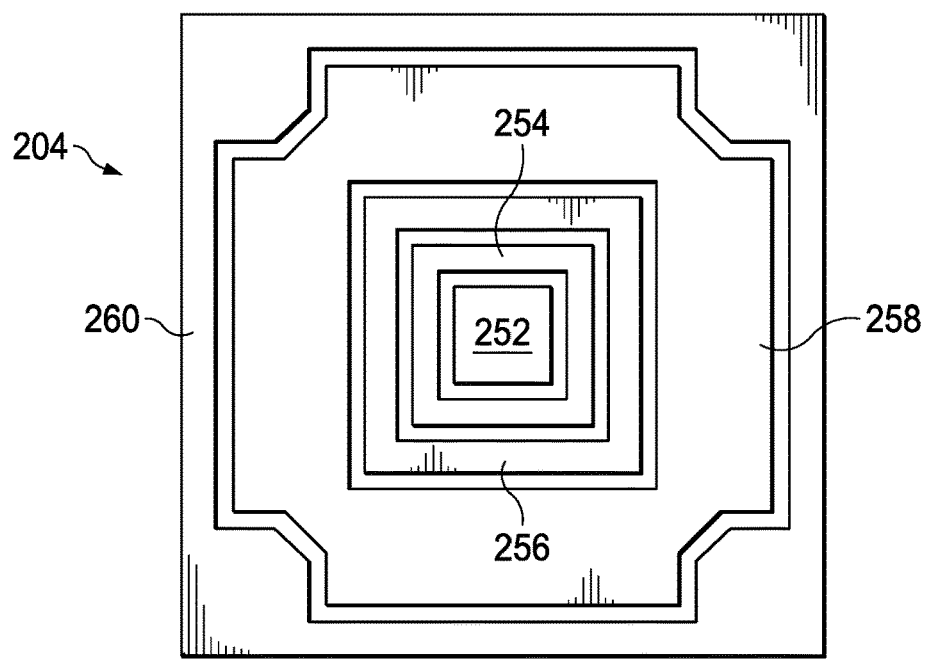
FIG. 2 is a perspective view of a 4-bit electrode design and an overhead view of a bottom electrode in accordance with various examples.
Figure 2:
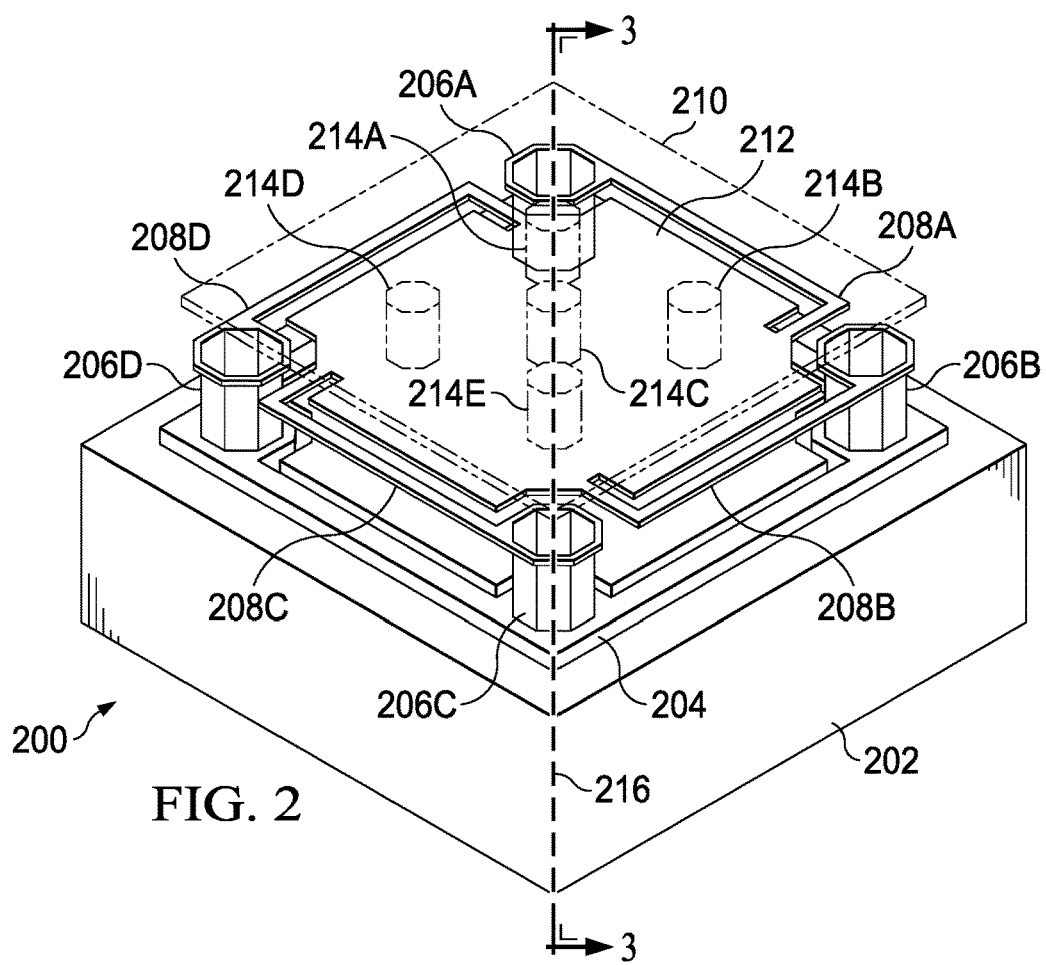
Figure 5:
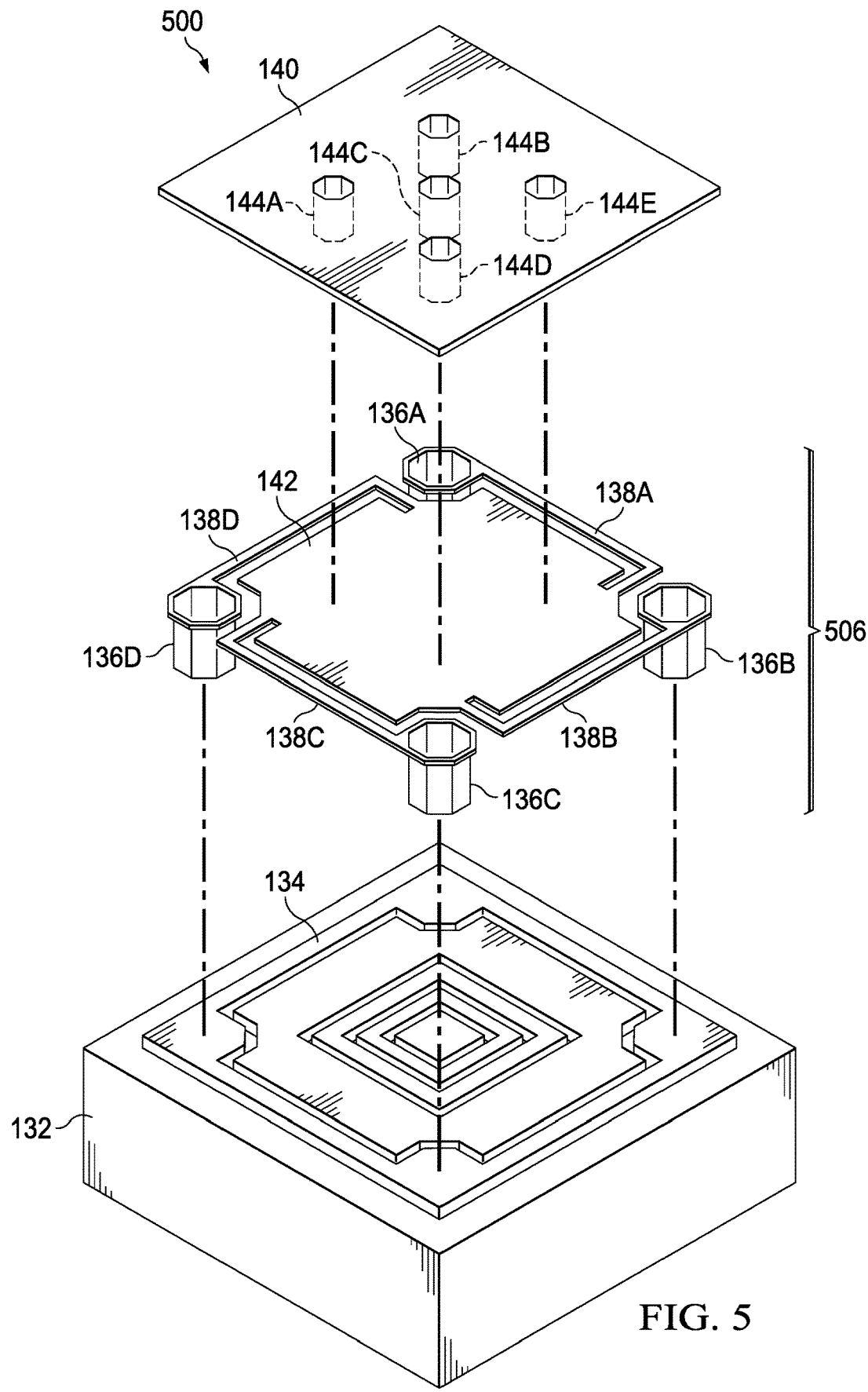
FIG. 5 is an exploded view of a 4-bit electrode design in accordance with various examples.

FIG. 1A includes design 130 in accordance with various examples herein. Design 130 is a 4-bit electrode design. Design 130 includes a base 132, bottom electrode 134, support posts 136A, 136B, 136C, and 136D (collectively, support posts 136), hinges 138A, 138B, 138C, and 138D (collectively, hinges 138), mirror plate 140, top plate 142, and mirror via posts 144A, 144B, 144C, 144D, and 144E (collectively, mirror via posts 144). Support posts 136, hinges 138, mirror plate 140, top plate 142, and mirror via posts 144 may be aluminum alloys in one example. Base 132 is a complementary metal-oxide semiconductor (CMOS) memory array, such as a static random access memory (SRAM) memory array in one example. Bottom electrode 134 is also referred to as an electrode structure. Bottom electrode 134 includes four segments (e.g., four electrodes) that are individually addressed to provide sixteen discrete positions for mirror plate 140. Bottom electrode 134 also includes a bias electrode. The four electrodes and bias electrode are not labeled in FIG. 1A, but are shown in FIG. 2 and described below. Support posts 136 couple the bias electrode portion of bottom electrode 134 to hinges 138. Each of the hinges 138 is coupled to an outside edge of a support post 136, away from the center of top plate 142. If hinges 138 were coupled to the center of support post 136, top plate 142 would be smaller. With this example, top plate 142 is larger. A larger top plate allows for more electrostatic force to be created between bottom electrode 134 and top plate 142, as described below. The hinges 138 are also coupled to top plate 142. In addition, each hinge 138 has a 90 degree turn (146A, 146B, 146C, and 146D, collectively turns 146) where the hinge couples to top plate 142. The turns 146 provide flexibility for the hinge 138, so the hinge 138 may flex if a voltage difference exists between top plate 142 and bottom electrode 134, which allows top plate 142 to move up and down relative to bottom electrode 134. Mirror plate 140 is coupled to top plate 142 by way of mirror via posts 144 (shown as dashed lines in FIG. 1A). An exploded view of design 130 is shown in FIG. 5.

In operation, a bias voltage is applied to support posts 136, hinges 138, top plate 142, and mirror plate 140, which are coupled to one another and therefore are each at the same bias voltage. The bias voltage may be 0 V in one example, or could be another voltage in another example. Voltages greater than 0 V are applied to some combination of the four segments of bottom electrode 134. The voltage difference between the bottom electrode 134 and the top plate 142 creates an electrostatic force that pulls the top plate 142 down toward bottom electrode 134. Mirror plate 140 moves down with top plate 142 as well. The movement up and down of top plate 142 and mirror plate 140 (with respect to bottom electrode 134) modulates the phase of the light that is reflected by mirror plate 140. Voltages are applied to different combinations of the four segments of bottom electrode 134 to move mirror plate 140 and top plate 142 to different vertical positions. Moving the mirror plate 140 up and down at a high frequency modulates the phase of the reflected light, and images are produced using an array of mirror plates 140.

With design 130, the 4-bit electrode design for bottom electrode 134 provides sixteen discrete vertical positions for mirror plate 140. The geometry for bottom electrode 134 is described below, and provides good linearity for the addressable vertical positions. Linearity provides uniformity in the amount of vertical movement of the mirror plate 140 between the 16 positions. Described another way, a number of vertical positions is chosen for use, either 16 or fewer than 16. If fewer than 16 are chosen for use, the chosen subset of the 16 positions are selected using a mapping algorithm, described below. The mapping algorithm chooses the final positions (out of 16) based on whether the final selected positions provide acceptable linearity of the vertical movement of the mirror plate 140.

Also, with design 130, each hinge 138 connects tangentially to an edge of a support post 136, instead of to the center of support post 136. By connecting to an edge of support post 136, top plate 142 is larger, and more usable area beneath top plate 142 is available for bottom electrode 134. A larger bottom electrode 134 allows for more electrostatic force to be created between bottom electrode 134 and top plate 142, which is useful for increasing the amount of vertical movement of top plate 142 and mirror plate 140.

Figure 6:
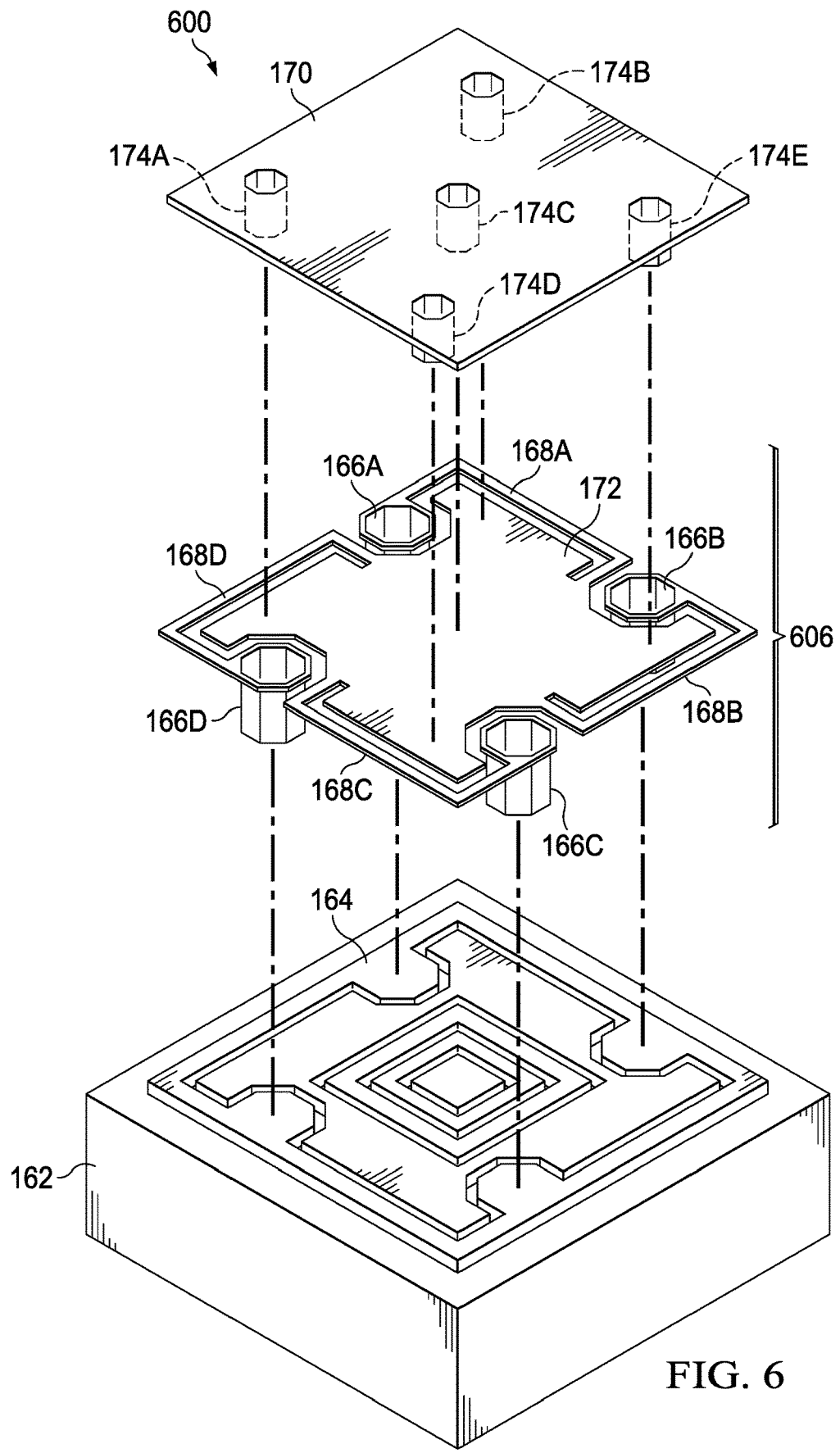
FIG. 6 is an exploded view of a 4-bit electrode design in accordance with various examples.

FIG. 1B includes design 160 in accordance with various examples herein. Design 160 is also a 4-bit electrode design, like design 130. Design 160 includes a base 162, bottom electrode 164, support posts 166A, 166B, 166C, and 166D (collectively, support posts 166), hinges 168A, 168B, 168C, and 168D (collectively, hinges 168), mirror plate 170, top plate 172, and mirror via posts 174A, 174B, 174C, 174D, and 174E (collectively, mirror via posts 174). Support posts 166, hinges 168, mirror plate 170, top plate 172, and mirror via posts 174 may be aluminum alloys in one example. Base 162 is a CMOS SRAM memory array in one example. Bottom electrode 164 is also referred to as an electrode structure. Bottom electrode 164 includes four segments that are individually addressed to provide sixteen discrete positions for mirror plate 170. Bottom electrode 164 also includes a bias electrode. The four electrodes and bias electrode are not labeled in FIG. 1B, but are shown in FIG. 2 and described below. Support posts 166 couple the bias electrode portion of bottom electrode 164 to hinges 168. Each of hinges 168 is coupled to an outside edge of a support post 166, away from the center of top plate 172 (instead of being coupled to the center of the support post 166). The hinges 168 are also coupled to top plate 172. In addition, each hinge 168 has two 90 degree turns: one turn at a corner of design 160 (turns 176A, 176B, 176C, and 176D, collectively turns 176) and one turn where the hinge couples to top plate 172 (turns 178A, 178B, 178C, and 178D, collectively turns 178). The turns 176 and 178 provide flexibility for the hinge 168, so the hinge 168 may flex if a voltage difference exists between top plate 172 and bottom electrode 164, which allows top plate 172 to move up and down relative to bottom electrode 164. Two turns in each hinge 168 may provide more relief of hinge stresses than one turn in each hinge 168. Mirror plate 170 is coupled to top plate 172 by way of mirror via posts 174 (shown as dashed lines in FIG. 1B). An exploded view of design 160 is shown in FIG. 6.

Design 160 operates similarly to design 130, as described above. The details are omitted here. In short, the voltage difference between the bottom electrode 164 and the top plate 172 creates an electrostatic force that pulls the top plate 172 down toward bottom electrode 164. Mirror plate 170 moves down with top plate 172 as well. The movement up and down of mirror plate 170 modulates the phase of the light that is reflected by mirror plate 170 to produce images.

With design 160, the 4-bit electrode design for bottom electrode 164 provides sixteen discrete vertical positions for mirror plate 170. The geometry for bottom electrode 164 is described below with respect to FIG. 2, and provides good linearity for the addressable vertical positions, as described above for design 130. In design 160, each hinge 168 couples to top plate 172 on an adjacent side from the support post 166 that each respective hinge couples to. For example, hinge 168A couples to support post 166A. Hinge 168A couples to top plate 172 on a side of top plate 172 that is adjacent to the side of top plate 172 where support post 166A is located. The hinge design shown in design 160 may provide increased hinge compliance and additional relief of hinge stresses for better thermal stability. Also, design 160 allows alternate locations for support posts 166 compared to design 130. These alternate locations for support posts 166 and the advantages thereof for design 160 are described below with respect to FIG. 7.

Variations of design 130 and design 160 may incorporate five or fewer mirror via posts (144, 174) in accordance with various examples described herein. Also, process improvements may be implemented for design 130 and design 160. The process improvements are described below. As one example, gaps between micromirrors may be reduced, which may result in reduced diffraction losses and improved fill factor (e.g., the ratio of the light sensitive area to the total area of the PLM).

FIG. 2 is a diagram of a 4-bit electrode design 200 and a bottom electrode 204 in accordance with various examples herein. Design 200 is similar to design 130 in FIG. 1A but provides a different view, and is shown on the bottom of FIG. 2. Design 200 includes a base 202, bottom electrode 204, support posts 206A, 206B, 206C, and 206D (collectively, support posts 206), hinges 208A, 208B, 208C, and 208D (collectively, hinges 208), mirror plate 210, and top plate 212. Mirror via posts 214A, 214B, 214C, 214D, and 214E (collectively, mirror via posts 214) are shown in FIG. 2. A dashed line representing a cross-section 216 is shown in design 200, which is discussed with respect to FIG. 3 below. Base 202 is a CMOS SRAM memory array in one example. Bottom electrode 204 is also referred to as an electrode structure. Bottom electrode 204 includes four segments that are individually addressed to provide sixteen discrete positions for mirror plate 210. Support posts 206 couple bottom electrode 204 to hinges 208. Each of hinges 208 is coupled to an edge of a support post 206 and to top plate 212. In addition, each hinge 208 has a 90 degree turn where the hinge couples to top plate 212. Mirror plate 210 is coupled to top plate 212 by way of mirror via posts 214.

The top of FIG. 2 is an overhead view of bottom electrode 204. Bottom electrode 204 includes four addressable segments: first electrode 252, second electrode 254, third electrode 256, and fourth electrode 258. Bottom electrode 204 also includes bias electrode 260. In this design for a 4-bit bottom electrode, the four addressable electrodes are arranged in a concentric ring design. First electrode 252 is at or near the center of bottom electrode 204, and has a square or rectangular shape in this example. Second electrode 254 surrounds first electrode 252. Second electrode 254 also has a square or rectangular shape. In some examples, second electrode 254 may not completely surround first electrode 252. Third electrode 256 surrounds second electrode 254. Third electrode 256 also has a square or rectangular shape. In some examples, third electrode 256 may not completely surround second electrode 254. Fourth electrode 258 surrounds third electrode 256. Fourth electrode 258 also has a square or rectangular shape along its inner edge that is closest to third electrode 256. In some examples, fourth electrode 258 may not completely surround third electrode 256. Fourth electrode 258 includes "cutouts" at or near its corners where support posts 206 are connected to bias electrode 260, which gives the outer edge of fourth electrode 258 an irregular shape. Bias electrode 260 surrounds fourth electrode 258. Bias electrode 260 also has a square or rectangular shape on its outer edge, with an irregular shape on its inner edge due to the shape of fourth electrode 258. Bottom electrode 204 is one example of a 4-bit electrode design, but other electrode designs may be used in other examples. For example, another electrode design may include electrodes that have a different shape or size than the electrodes shown here. The electrode widths or the distance between electrodes may also vary in other designs. In one example, the innermost electrode may have an "X" shape. The other electrodes may have an "X" shape as well, or some of the other electrodes may have a different shape. In some designs, the electrodes may have round, triangular, rectangular, hexagonal, or octagonal shapes, or any combination of these shapes. The four electrodes in a 4-bit electrode design may have similar shapes to one another, or some electrodes may have different shapes from one another. The electrodes may have any shape in other examples, including irregular shapes or non-symmetric shapes.

The shape of bottom electrode 204 herein provides good linearity between the vertical micromirror positions. In one example, simulations of different bottom electrode designs were conducted and the design described herein provided a high amount of linearity. The dimensions of the design described herein were also selected to provide a high amount of linearity compared to other simulated designs. However, in other examples, a different bottom electrode design may be used for a 4-bit bottom electrode and fall within the scope of this description. Also, in other examples, the dimensions of the components of bottom electrode 204 may differ from the dimensions described below with respect to FIG. 8.

Any combination of first electrode 252, second electrode 254, third electrode 256 and fourth electrode 258 may be activated via CMOS SRAM memory cells in base 202. One memory cell in the CMOS SRAM memory cells is associated with each electrode. Voltages are applied to the electrodes based on the value stored in the memory cells. As an example, if a logical value 0 is stored in the memory cell, a low voltage is applied to the electrode associated with that memory cell, such as 0 V. If a logical value 1 is stored in the memory cell, a high voltage is applied to the electrode associated with that memory cell, such as 10 V. The electrode that have a logical value 1 stored in their associated memory cell are referred to as activated. The combination of these four electrodes that is activated adjusts mirror plate 210 to a programmed vertical height above bottom electrode 204. The vertical height of mirror plate 210 is adjusted to modulate the phase of the light directed toward mirror plate 210 to provide phase light modulation. The heights of the mirrors in an array of mirror plates 210 may be individually adjusted to create images or perform other applications as described above. For example, the electrodes could each be off (0 V) or raised up to the highest voltage (e.g., activated), which is 10 V in one example. In another example, different voltage values could be applied to different electrodes, rather than applying either 0 V and 10V to each electrode depending on the logical value stored in the memory cell. With all four electrodes activated (10 volts), the maximum electrostatic force pulls mirror plate 210 down towards bottom electrode 204 for maximum vertical displacement of mirror plate 210. With all four electrodes off (0 volts), the minimum force is applied to mirror plate 210, which may result in no vertical displacement for mirror plate 210. Other combinations of the four electrodes are activated for the intermediate positions between the maximum and minimum vertical displacements of mirror plate 210.

A bias signal (e.g., a voltage) is applied to bias electrode 260. The bias signal may be 0 volts in one example, but a different voltage could be used in other examples. Bias electrode 260 is coupled to support posts 206, as shown in design 200. Bias electrode 260 and support posts 206 provide an electrical path through support posts 206, through hinges 208 and top plate 212, through mirror via posts 214, and to mirror plate 210. The bias signal provides a voltage at top plate 212 by using this electrical path. The voltage of the top plate 212 relative to the bottom electrode 204 provides the actuating force on mirror plate 210 that actuates mirror plate 210 vertically. For example, if the bias signal is at 0 volts, and the voltage at each electrode of bottom electrode 204 is 10 V, then the maximum electrostatic force exists between mirror plate 210 and bottom electrode 204. This maximum electrostatic force will pull mirror plate 210 down towards bottom electrode 204 for maximum vertical displacement of mirror plate 210. Other combinations of voltages on electrodes 252, 254, 256, and 258 operate to actuate mirror plate 210 to one of the intermediate positions. The bias signal also provides an electrostatic shield that separates the voltages on one mirror's electrodes from voltages on an adjacent mirror's electrodes, when the mirrors are arranged in an array.

Figure 3:
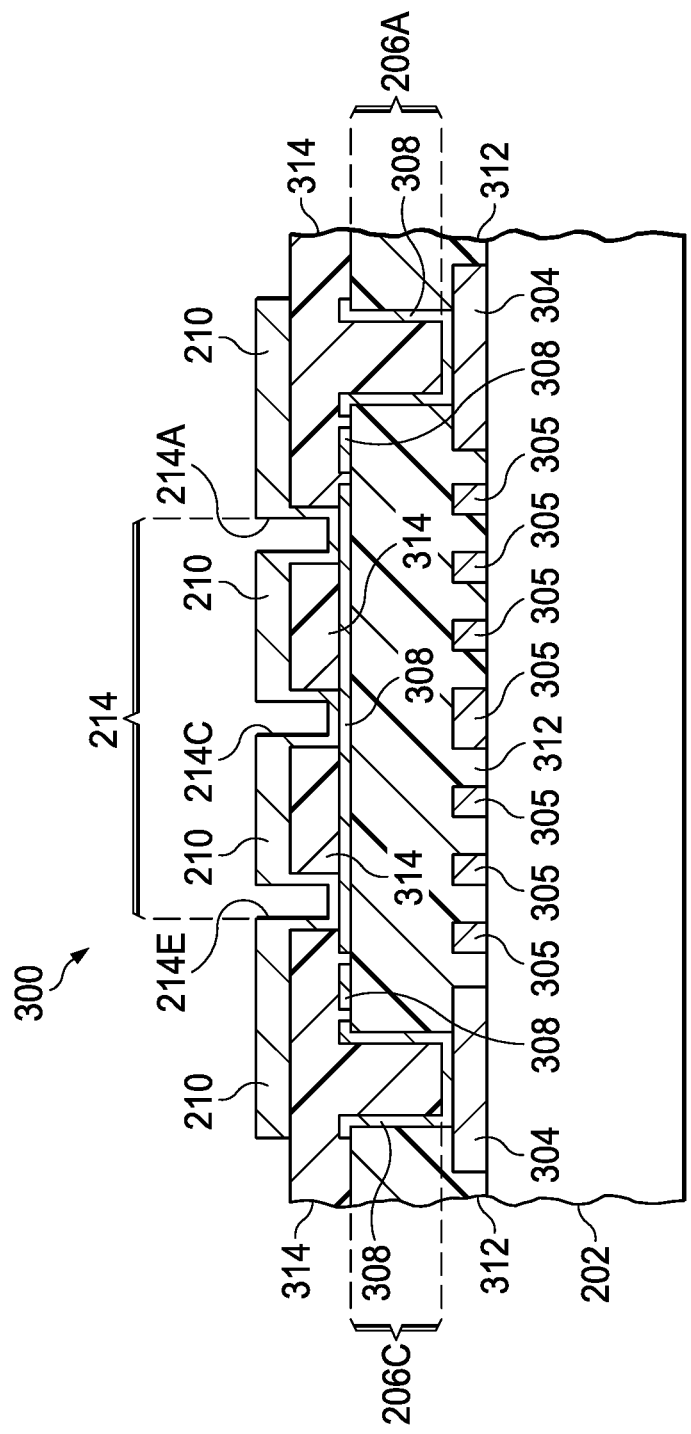
FIG. 3 is a diagram of a process cross-section for a 4-bit electrode in accordance with various examples.

FIG. 3 is a diagram 300 of a process cross-section for a 4-bit electrode in accordance with various examples herein, meaning that diagram 300 represents a 4-bit electrode during manufacture. Some components of FIG. 3 have the same reference numeral as components in FIG. 2, and like reference numerals refer to like components. Diagram 300 is a cross-section similar to the dashed line representing cross-section 216 in FIG. 2. Diagram 300 includes base 202, bias electrode 304, electrodes 305, support posts 206A and 206C (collectively, support posts 206), hinge layer 308, mirror plate 210, spacer 1 312, spacer 2 314, and mirror via posts 214A, 214C, and 214E (collectively, mirror via posts 214). Base 202 is a CMOS SRAM memory array in one example. Electrodes 305 are metal layers that include four electrodes to provide 4-bit addressing as described above. The size of and the gaps between electrodes 305 in this cross-section view are not necessarily to scale. The memory cells in base 202 activate any combination of the four electrodes 305 to vertically move mirror plate 210 to the proper position during operation. In this cross-section, support posts 206A and 206C are shown, but the 4-bit electrode may have four support posts as shown in FIGS. 1 and 2.

Hinge layer 308 is a metal layer that forms the flexible hinges and support posts. Hinge layer 308 may be an aluminum alloy in one example. Mirror plate 210 is a metal layer that forms the mirror and mirror via posts 214 that connect to the top plate, such as top plate 212 shown in FIG. 2. Mirror plate 210 may also be an aluminum alloy in one example. The metal layers may be formed using a sputtered metal deposition process in one example.

Spacer 1 312 and spacer 2 314 are removed at the end of the manufacturing process for the 4-bit electrode. Spacer 1 312 and spacer 2 314 may be photoresist in one example. Spacer 1 312 and spacer 1 314 are sacrificial layers that are removed to release the components of the 4-bit electrode. Spacer 1 312 and spacer 2 314 may be removed using one or more dry or wet etching steps in one example. In one example, a liquid solution dissolves the material of spacer 1 312 and spacer 2 314, leaving the remaining structures in place. Spacer 1 312 is patterned to provide the shape for support posts 206 and hinge layer 308. Mirror plate 210 is formed on spacer 2 314, and spacer 2 314 is patterned to include openings for the mirror via posts 214A, 214C, and 214E. Three mirror via posts 214 are visible in this cross-section, but the number of mirror via posts may vary in some examples as described below. Some examples below describe 4-bit electrodes with one, four, or five mirror via posts 214. After spacer 1 312 and spacer 2 314 are removed, the 4-bit electrode design 200 shown in FIG. 2 remains.

In some examples, thickness of spacer 1 312 is greater than alternative designs, such as the 3-bit electrode design. The thickness of spacer 1 312 may be 1.6 micrometers ±0.08 micrometers in some examples. Increasing the thickness of spacer 1 312 increases the vertical height of support posts 206, which are created by depositing metal on spacer 1 312. Taller support posts 206 increase the vertical distance that mirror plate 210 may move down toward electrodes 305. The increased vertical movement of the mirror plate 210 provides for a wider range of modulation of the phase of the light reflected by the mirror plate 210. Greater control of the modulation of the light provides improved optical performance in some examples.

In some examples, the gaps between mirrors arranged in an array may be reduced compared to some designs. In one example, the mirror gaps are reduced from 0.35 micrometers to 0.30 micrometers. Smaller mirror gaps may increase the fill factor of the PLM and may also reduce diffraction losses in some examples.

Figure 4:
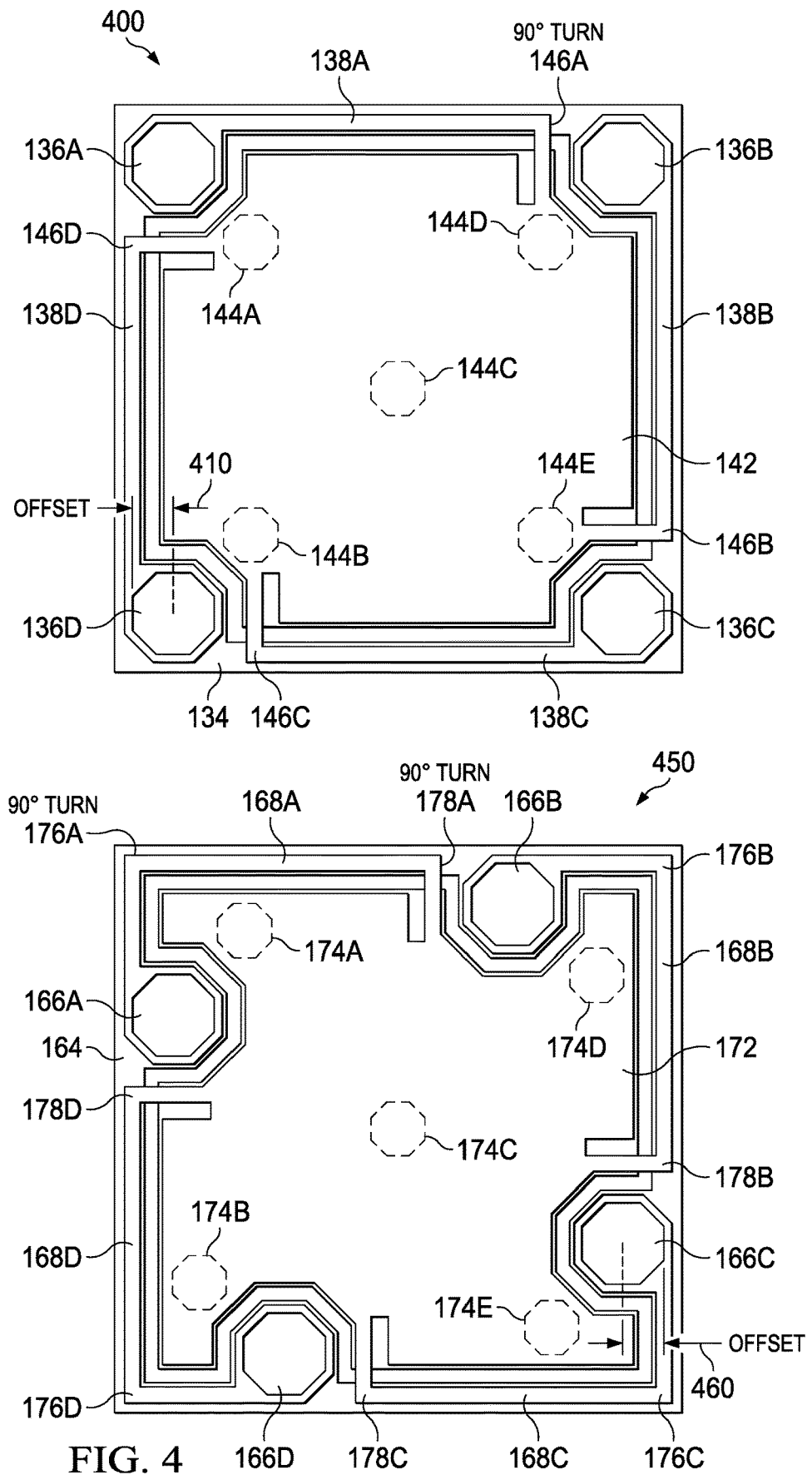
FIG. 4 shows overhead views of offset hinge designs in accordance with various examples.

FIG. 4 shows overhead views of offset hinge designs 400 and 450 in accordance with various examples herein. Offset hinge design 400 is the hinge design from design 130 in FIG. 1. Offset hinge design 450 is the hinge design from design 160 in FIG. 1. Offset hinge designs 400 and 450 are each coupled to a 4-bit electrode in one example. Some components of FIG. 4 have the same reference numeral as components in FIGS. 1A or 1B, and like reference numerals refer to like components.

Offset hinge design 400 includes support posts 136A, 136B, 136C, and 136D (collectively, support posts 136) and hinges 138A, 138B, 138C, and 138D (collectively, hinges 138). Offset hinge design 400 includes top plate 406 and mirror via posts 144A, 144B, 144C, 144D, and 144E (collectively, mirror via posts 144). Offset hinge design also includes offset 410, 90° turns 146A, 146B, 146C, and 146D (collectively, turns 146), and bottom electrode 134. Bottom electrode 134 is also referred to as an electrode structure.

In offset hinge design 400, hinges 138 are each connected to an edge of a respective support post 136 instead of to the center of support post 136. The offset between the edge of a support post 136 and the center of support post 136 is shown as offset 410 in FIG. 4. One offset 410 is labeled in FIG. 4, although each of the four hinges 138 has a similar offset. By having the hinge 138 so it connects tangentially to support post 136 instead of to the center of support post 136, top plate 406 may be made larger. Also, more usable area for the bottom electrode 134 is provided by having hinges 138 closer to the edges of offset hinge design 400.

Also, in offset hinge design 400, each hinge 138 has a 90° turn 146 where hinge 138 connects to top plate 406. The turn 146 may be more or less than 90° in other examples. The 90° turn 146 provides relief of mechanical hinge stresses for better thermal stability.

Offset hinge design 450 includes support posts 166A, 166B, 166C, and 166D (collectively, support posts 166) and hinges 168A, 168B, 168C, and 168D (collectively, hinges 168). Offset hinge design 450 includes top plate 172 and mirror via posts 174A, 174B, 174C, 174D, and 174E (collectively, mirror via posts 174). Offset hinge design 450 also includes offset 460, 90° turns 176A, 176B, 176C, and 176D (collectively, turns 176), 90° turns 178A, 178B, 178C, and 178D (collectively, turns 178), and bottom electrode 164. Bottom electrode 164 is also referred to as an electrode structure.

In offset hinge design 450, hinges 168 are each connected to an edge of a respective support post 166 instead of to the center of support post 166. The offset between the edge of a support post 166 and the center of support post 166 is shown as offset 460 in FIG. 4. Each of the four hinges 168 has a similar offset in this example. As described above, hinge 168 connecting tangentially to support post 166 instead of to the center of support post 166 allows a larger top plate 172. Also, more usable area for the bottom electrode 164 is provided by moving hinges 168 closer to the edges of offset hinge design 450. A larger top plate 172 and a larger bottom electrode 164 may provide greater electrostatic force to actuate the mirror in an example.

In offset hinge design 450, each hinge 168 has two 90° turns, such as 176A and 178A for hinge 168A. In this example, 90° turn 176A is located at a corner of offset hinge design 450, and 90° turn 178A is located where hinge 168 connects to top plate 172. Each hinge 168 has similar 90° turns in this example. The turns may be more or less than 90° in other examples. By using two 90° turns, offset hinge design 450 provides increased hinge compliance and additional relief of hinge stresses for improved thermal stability. Also, offset hinge design 450 provides for alternate locations for support posts 166. These alternate locations are described below. In short, with offset hinge design 400, the support posts 136 are located at the corners of the design. If the electrodes are arranged in rows and columns, the support posts of adjacent electrodes will be close to one another near these corners. However, with offset hinge design 450, the support posts are offset from the corners of the hinge structure. The support posts may be offset from the corners between 0.5 and 3.0 micrometers in one example. Therefore, more space exists between a support post on a first electrode and the nearest support post on an adjacent electrode. An example is described with respect to FIG. 7 below.

Both offset hinge design 400 and offset hinge design 450 have larger top plates and more usable area for the bottom electrode than some 3-bit electrode designs. In offset hinge design 450, the location of mirror via posts 174 is different than the location of mirror via posts 144 in offset hinge design 400. The mirror via posts 174 are closer to the edges of top plate 172 than mirror via posts 144 are to the edges of top plate 406. In other examples, the mirror via posts 144 and 174 may be in different locations. Also, in other examples, fewer than five mirror via posts may be used for either offset hinge design 400 or offset hinge design 450.

FIG. 5 is an exploded view of a 4-bit electrode design 500 in accordance with various examples. Design 500 is similar to design 130 in FIG. 1A and offset hinge design 400 in FIG. 4. Some components of FIG. 5 have the same reference numeral as components in FIG. 1A, and like reference numerals refer to like components. Design 500 includes a base 132, bottom electrode 134, and hinge structure 506. Hinge structure 506 includes support posts 136A, 136B, 136C, and 136D (collectively, support posts 136), hinges 138A, 138B, 138C, and 138D (collectively, hinges 138), and top plate 142. In this example, each hinge 138 includes a 90° turn and is coupled at one end to an outside edge of a support post 136, and at the other end to top plate 142. Hinges 138 may be any suitable shape, length, or thickness. Design 500 also includes mirror plate 140 and mirror via posts 144A, 144B, 144C, 144D, and 144E (collectively, mirror via posts 144). Five mirror via posts 144 are shown in this example, but other examples may use a different number of mirror via posts 144, as described below.

Base 132 is a CMOS SRAM memory array in one example. Bottom electrode 134 includes four segments that are individually addressed and configured to provide sixteen discrete positions for mirror plate 140. Support posts 136 couple bottom electrode 134 to hinges 138. Each of hinges 138 is coupled to an edge of a support post 136 and to top plate 142 in this example. In addition, each hinge 138 has a 90° turn where the hinge 138 couples to top plate 142. Mirror plate 140 is coupled to top plate 142 via mirror via posts 144.

In operation, a bias voltage is applied to support posts 136, hinges 138, top plate 142, and mirror plate 140, which are coupled to one another and therefore are each at the same bias voltage. The bias voltage may be 0 V in one example. Voltages greater than 0 V are applied to some combination of the four segments of bottom electrode 134. The voltage difference between the bottom electrode 134 and the top plate 142 creates an electrostatic force that pulls the top plate 142 down toward bottom electrode 134. Top plate 142 moves up and down due to the flexibility of hinges 138. Mirror plate 140 moves up and down with top plate 142 as well. The movement up and down of mirror plate 140 modulates the phase of the light that is reflected by mirror plate 140. Voltages are applied to different combinations of the four segments of bottom electrode 134 to move mirror plate 140 to different vertical positions. Moving the mirror plate 140 up and down at a high frequency modulates the phase of the reflected light, and images are produced using an array of mirror plates 140.

Each mirror plate 140 in an array may be positioned using 4-bit digital addressing, which increases the possible number of micromirror positions to 16. The increased number of positions improves diffraction efficiency and optical performance compared to a system with 3-bit addressing. The 4-bit electrode design described herein also makes more efficient use of space compared to the 3-segment electrode by moving hinge positions further away from the center of the mirror plate 140. This allows for a larger top plate 142 and larger bottom electrode 134, which may increase the electrostatic force, providing for a greater amount of vertical movement of mirror plate 140.

FIG. 6 is an exploded view of a 4-bit electrode design 600 in accordance with various examples. Design 600 is similar to design 160 in FIG. 1B and offset hinge design 450 in FIG. 4. Some components of FIG. 6 have the same reference numeral as components in FIG. 1B, and like reference numerals refer to like components. Design 600 includes a base 162, bottom electrode 164, and hinge structure 606. Hinge structure 606 includes support posts 166A, 166B, 166C, and 166D (collectively, support posts 166), hinges 168A, 168B, 168C, and 168D (collectively, hinges 168), and top plate 172. In this example, each hinge 168 includes two 90° turns, and is coupled at one end to an outside edge of a support post 166, and at the other end to top plate 172. One 90° turn is located near a corner of hinge structure 606, and another 90° turn is near a support post 166. Hinges 168 may be any suitable shape, length, or thickness. Design 600 also includes mirror plate 170 and mirror via posts 174A, 174B, 174C, 174D, and 174E (collectively, mirror via posts 174). Five mirror via posts 174 are shown in this example, but other examples may use a different number of mirror via posts 174, as described below.

Base 162 is a CMOS SRAM memory array in one example. Bottom electrode 164 includes four segments that are individually addressed and configured to provide sixteen discrete positions for mirror plate 170. Support posts 166 couple bottom electrode 164 to hinges 168. Each of hinges 168 is coupled to an edge of a support post 166 and to top plate 172 in this example. In addition, each hinge 168 has two 90° turns; one at a corner of hinge structure 606 and one where the hinge 168 couples to top plate 172. Mirror plate 170 is coupled to top plate 172 via mirror via posts 174.

Design 600 operates similarly to design 500 described above. A bias voltage is applied to support posts 166, hinges 168, top plate 172, and mirror plate 170, which are coupled to one another and therefore are each at the same bias voltage. The bias voltage may be 0 V in one example. Voltages greater than 0 V are applied to some combination of the four segments of bottom electrode 164. The voltage difference between the bottom electrode 164 and the top plate 172 creates an electrostatic force that pulls the top plate 172 down toward bottom electrode 164. Top plate 172 moves up and down due to the flexibility of hinges 168. Mirror plate 170 moves up and down with top plate 172 as well. The movement up and down of mirror plate 170 modulates the phase of the light that is reflected by mirror plate 170. Voltages are applied to different combinations of the four segments of bottom electrode 164 to move mirror plate 170 to different vertical positions. Moving the mirror plate 170 up and down at a high frequency modulates the phase of the reflected light, and images are produced using an array of mirror plates 170.

Each mirror plate 170 in an array may be positioned using 4-bit digital addressing, which increases the possible number of micromirror positions to 16. The increased number of positions improves diffraction efficiency and optical performance compared to a system with 3-bit addressing. The 4-bit electrode design described herein also makes more efficient use of space compared to the 3-segment electrode by moving hinge positions further away from the center of the mirror plate 170. This allows for a larger top plate 172 and larger bottom electrode 164, which may increase the electrostatic force, providing for a greater amount of vertical movement of mirror plate 170. Also, in design 600, each hinge 168 has a second turn or angle that increases the length of the hinge 168, and allows the support posts 166 to be spaced further apart. Support posts 166 may be offset from the corners of hinge structure 606 between 0.5 and 3.0 micrometers in one example. Spacing the support posts 166 further apart may introduce process improvements that create a flatter array of micromirrors, as described below with respect to FIG. 7. The second turn of the hinge 168 also increases hinge compliance and provides relief of hinge stresses for better thermal stability.

Figure 7:
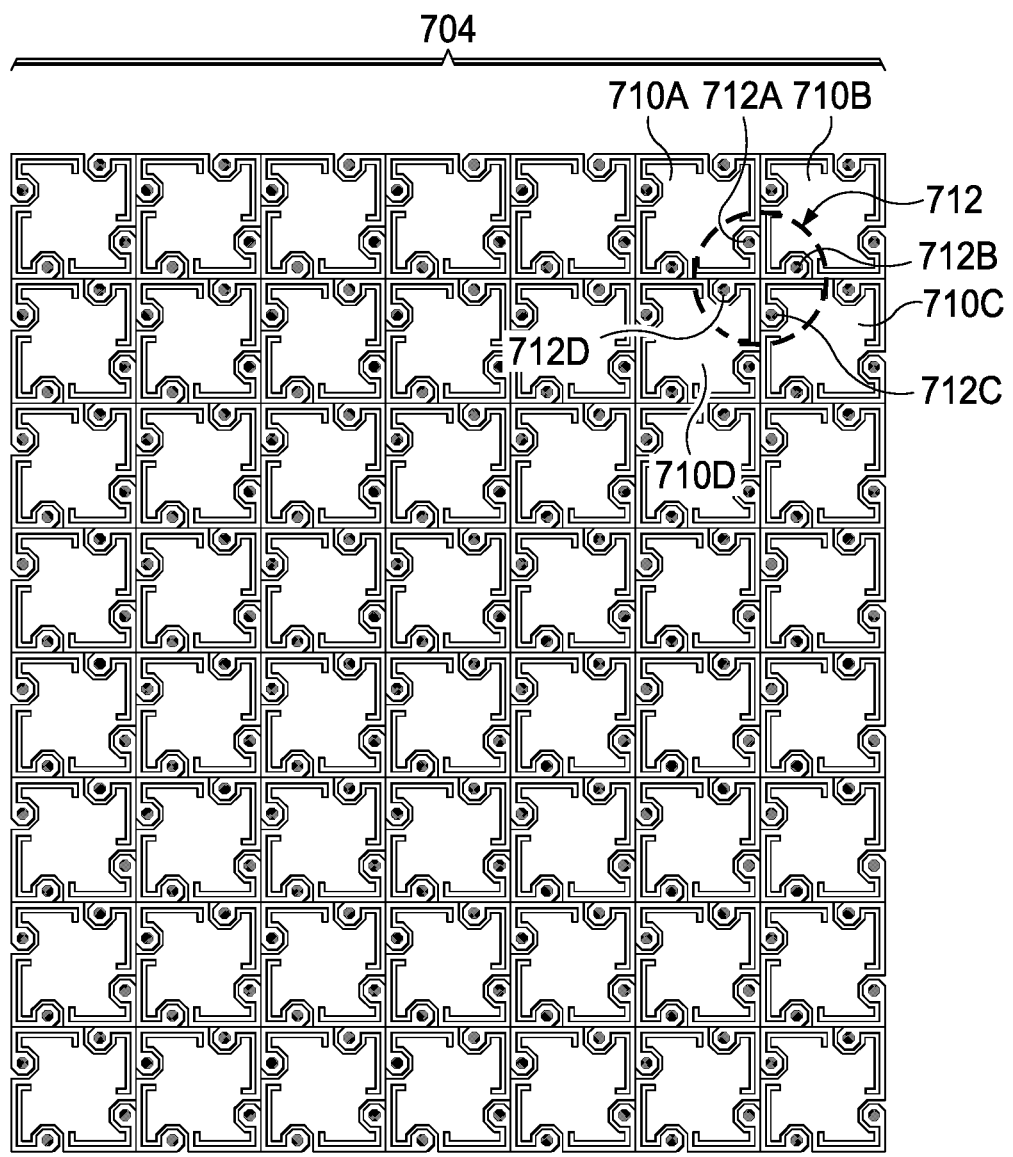
FIG. 7 is a schematic diagram illustrating support post spacing in accordance with various examples.

FIG. 7 is a diagram of support post spacings in accordance with various examples herein. FIG. 7 is an overhead view of an array of PLM electrodes arranged in rows and columns. FIG. 7 shows the top plates of each electrode and the support posts (which are coupled to the hinges) of each electrode. The support posts are represented as dots in the overhead view of FIG. 7. With spacing 704, more uniform flatness and improved planarization may be achieved in some examples. Spacing 704 is the spacing of support posts that results from design 160 in FIG. 1B or offset hinge design 450 in FIG. 4. In spacing 704, the support posts are placed slightly away from the corners of each electrode, due to the hinges that have two 90° turns (e.g., hinges 168 in FIG. 1B or hinges 168 in FIG. 4). The support posts may be offset away from the corners of each electrode approximately 0.5 to 3.0 micrometers in one example. Four electrodes of spacing 704 are labeled 710A, 710B, 710C, and 710D (collectively, electrodes 710). Each electrode 710 has four support posts offset from the corners of the respective electrode. At the intersection of electrodes 710A, 710B, 710C, and 710D, four support posts are circled and labeled as support posts 712A, 712B, 712C, and 712D (collectively, support posts 712). With spacing 704, the support posts 712 of adjacent electrodes are spaced apart rather than clustered together. With spacing 704, the spacer photoresist coating may avoid the local depressions that can occur when support posts are clustered together. This may result in a flatter coating compared to support posts that are clustered together. Therefore, the use of spacing 704, realized by using the hinge design with two 90° turns, may provide a more uniform process with improved planarization and an increase in the flatness of the mirrors of the PLM.

Figure 8:
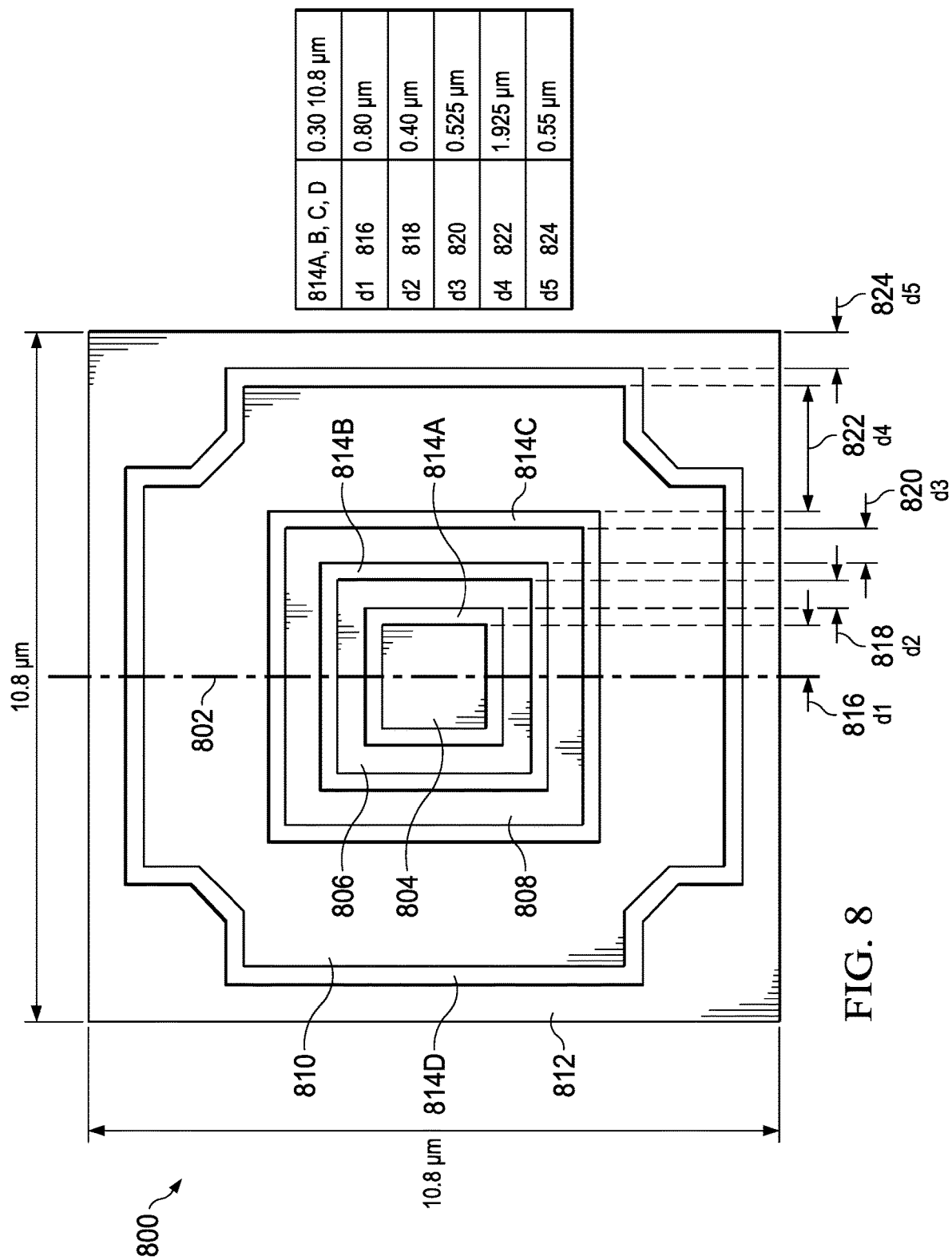
FIG. 8 is an overhead view of a bottom electrode design in accordance with various examples.

FIG. 8 is a design for bottom electrode 800 in accordance with various examples herein. Bottom electrode may also be referred to as an electrode structure. Bottom electrode 800 may be a bottom electrode for design 130 or offset hinge design 400 as described above, where each hinge is coupled to an edge of a support post and has one 90° turn. A similar design may be used for design 160 or offset hinge design 450 described above, where each hinge is coupled to an edge of a support post and has two 90° turns. However, for design 160 or offset hinge design 450, the fourth electrode would be shaped differently than shown in FIG. 8 due to the location of the support posts away from the corners of the bottom electrode. In that example, the bottom electrode design would be similar to the bottom electrode design show in FIG. 6 as bottom electrode 164. The dimensions for bottom electrode 800 in this example are selected to improve linearity of the displaced positions of the mirror plate in a 4-bit digital electrode. Linearity refers to the amount of mirror displacement between consecutive address states of the 4-bit digital electrode. For example, if the address state for the four bits changes from [1000], to [1001], to [1010], to [1011], and the amount of displacement of the mirror from one state to the next of these four consecutive states is equal (e.g., 90 nm of displacement, then 100 nm, then 110 nm, then 120 nm), then the system would have good linearity. In this example, the dimensions of bottom electrode 800 provide good linearity between the mirror's 16 displaced positions. True linearity may not be achievable, but better linearity is generally achieved by using fewer than the possible 16 positions of the 4-bit addressing. In some examples, up to 12 of the 16 positions may be used to provide linearity with an $R^2$ value of approximately 0.983. A user could choose to use fewer than the 16 possible positions to achieve better linearity among the displaced positions.

The design of bottom electrode 800 is one example design. Other designs, with different dimensions for the four electrodes and the spaces between them, may be used in other examples. The shapes of the four electrodes may also vary in other examples.

In this example, a center line 802 is shown that traverses the center of bottom electrode 800. Bottom electrode 800 includes four segments: first electrode 804, second electrode 806, third electrode 808, and fourth electrode 810. Bottom electrode 800 also includes bias electrode 812. Bottom electrode 800 also includes spaces 814A, 814B, 814C, and 814D (collectively, spaces 814). These spaces 814 are the gaps between the various electrodes 804, 806, 808, and 810. In one example, the spaces 814 each have a width of approximately 0.30 micrometers. In this example, bottom electrode 800 has a height and width of approximately 10.8 micrometers each.

First electrode 804 is located at the center of bottom electrode 800, and is approximately square. Each side of first electrode 804 is approximately 1.60 micrometers. Distance d1 816 is the distance from an edge of first electrode 804 to center line 802, and is approximately 0.80 micrometers in this example, which is half of the length of a side of first electrode 804 (e.g., 1.60 micrometers).

Second electrode 806 surrounds first electrode 804, and is approximately square in shape. Distance d2 818 is the width of second electrode 806, and is approximately 0.40 micrometers in this example. Third electrode 808 surrounds second electrode 806, and is also approximately square in shape. Distance d3 820 is the width of third electrode 808, and is approximately 0.525 micrometers in this example. Fourth electrode 810 surrounds third electrode 808. Fourth electrode 810 has an irregular shape due to the area where the hinge support posts contact bottom electrode 800, near the corners of bottom electrode 800. Distance d4 822 is the width of a certain portion of fourth electrode 810 as shown in FIG. 8, and is approximately 1.925 micrometers in this example.

Bias electrode 812 surrounds fourth electrode 810. The hinge support posts are coupled to bias electrode 812 to provide a path to couple the bias voltage signal to the top plate. Distance d5 824 is the width of a certain portion of bias electrode 812 along the edge of bottom electrode 800 as shown in FIG. 8, and is approximately 0.55 micrometers in this example. Bias electrode 812 also provides an electrostatic shield to separate each electrode from the electrical fields of adjacent electrodes, when the electrodes are arranged in an array. As described above, in one example bias electrode 812 may be 0 volts, while the electrode voltages may be 10 V if the electrode is on (address state 1), and 0 V if the electrode is off (address state 0).

Each of the four electrodes (804, 806, 808, and 810) is configured to displace the mirror by some amount when the electrode is turned on with the electrode's respective address bit. For example, if the address bits are [0001], first electrode 804 is on, while the other three electrodes are off. This address state will displace the mirror by a small amount, because first electrode 804 is the smallest electrode and therefore provides the least amount of electrostatic force to the top plate. If the address bits are [0010], second electrode 806 is on, while the other three electrodes are off. The mirror would be displaced by a larger amount than address state [0001], but the displacement may still be relatively small. If the address bits are [1000], fourth electrode 810 is on, and the other three electrodes are off. The mirror displacement may be quite large with this address state, because fourth electrode 810 is the largest electrode and therefore provides a relatively large amount of electrostatic force when it is on. If the address bits are [1111], all four electrodes are on. This address provides the largest amount of electrostatic force and therefore displaces the mirror by the largest amount of any of the address states. Each address state may displace the mirror by a different amount, and the appropriate address state is used to displace the mirror by a specific distance to produce phase modulation of light reflected by the mirror.

In some examples, a mapping algorithm may be used to adjust the address state by rank order of displacement positions. For example, the address states increase linearly, from [0000], to [0001], to [0010], etc. However, the displacement for each address state may not increase with each increase in the address state. For example, the displacement of the mirror for address [0011] may be greater than the displacement for address [0100], even though [0100] is a "higher" address state than [0011]. This phenomenon may occur due to the sizes and shapes of the four electrodes and how the electrostatic fields created by these electrodes interact with one another. In that case, a mapping algorithm can track these displacements and select the proper address for each requested displacement. If fewer than 16 positions are used, a mapping algorithm may also select the best ranked positions for linearity using the requested number of the 16 positions.

Figure 9:
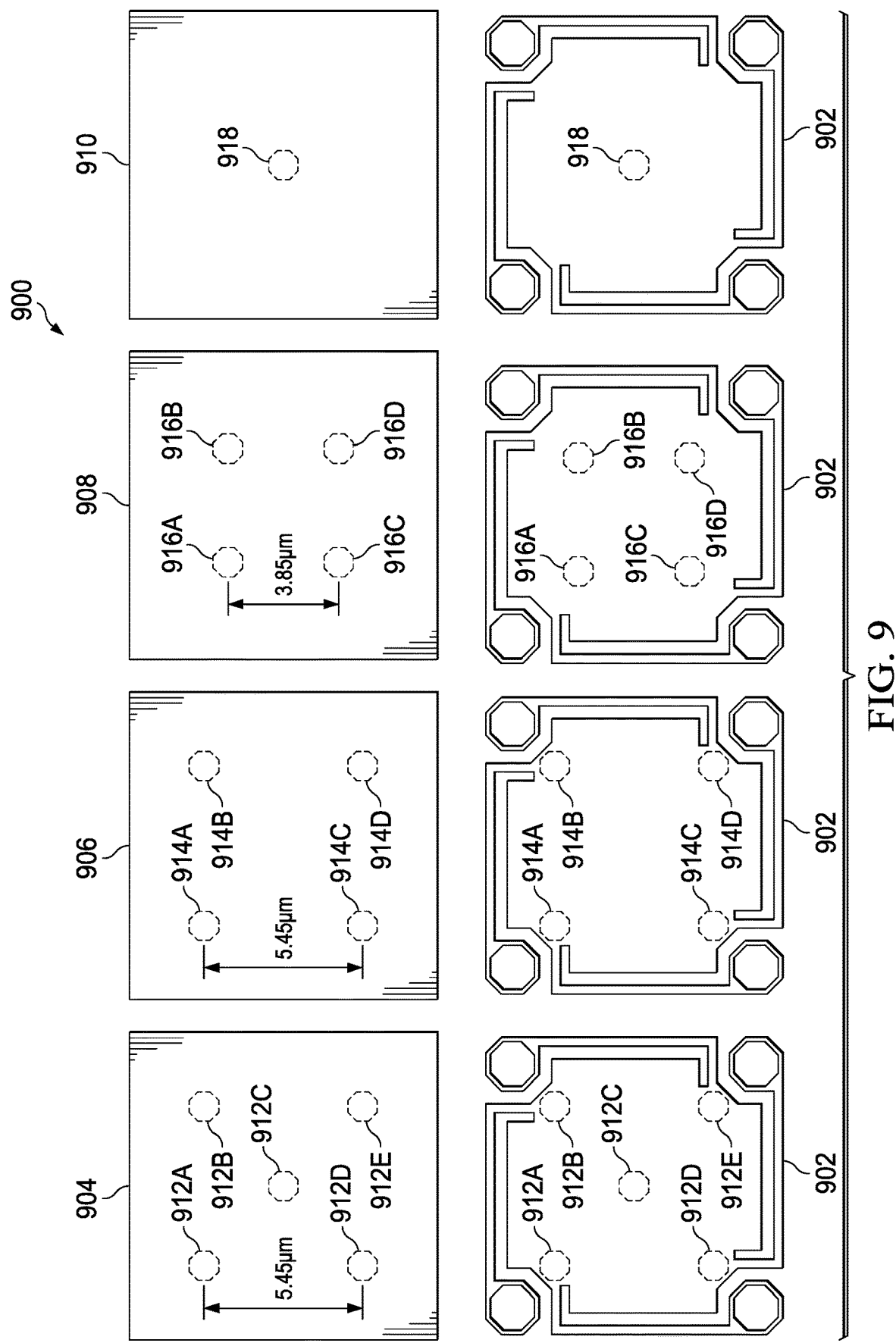
FIG. 9 shows overhead views of mirror via post configurations in accordance with various examples.

FIG. 9 is a diagram 900 of mirror via post configurations in accordance with various examples. In this example, mirror via posts for design 130 or offset hinge design 400 are shown. Offset hinge design 902 is shown at the bottom of diagram 900. Diagram 900 also includes four different mirror via post configurations 904, 906, 908, and 910. Mirror via post configuration 904 includes five mirror via posts 912A, 912B, 912C, 912D, and 912E (collectively, mirror via posts 912), arranged in an X-shaped pattern. In this example, the outer mirror via posts are approximately 5.45 micrometers apart.

Mirror via post configuration 906 includes four mirror via posts 914A, 914B, 914C, and 914D (collectively, mirror via posts 914) arranged in a square pattern. In this example, the mirror via posts are approximately 5.45 micrometers apart. Mirror via post configuration 908 also includes four mirror via posts 916A, 916B, 916C, and 916D (collectively, mirror via posts 916) arranged in a square pattern. In mirror via post configuration 908, the mirror via posts 916 are closer together than mirror via post configuration 906. In this example, the mirror via posts 916 in mirror via post configuration 908 are approximately 3.85 micrometers apart. Mirror via post configuration 910 includes a single via post 918 located approximately in the center of the mirror.

The different mirror via post configurations may change the way the structures (mirrors, hinges, etc.) deform after the spacers (spacer 1 and spacer 2) are removed. Different degrees of flatness may occur across an array of mirrors based on the different mirror via post configurations. Configurations without the mirror via post in the center (e.g., mirror via post configurations 906 and 908) may allow some extra flexibility of the top plate in some examples. Five mirror via posts may provide the strongest structural coupling between the mirror and hinge layer in some examples. Configurations with fewer mirror via posts may alleviate certain mechanical distortions caused by stress imbalances between the mirror and hinge layer in some examples. Fewer mirror via posts may provide better optical quality in some examples.

Figure 10:
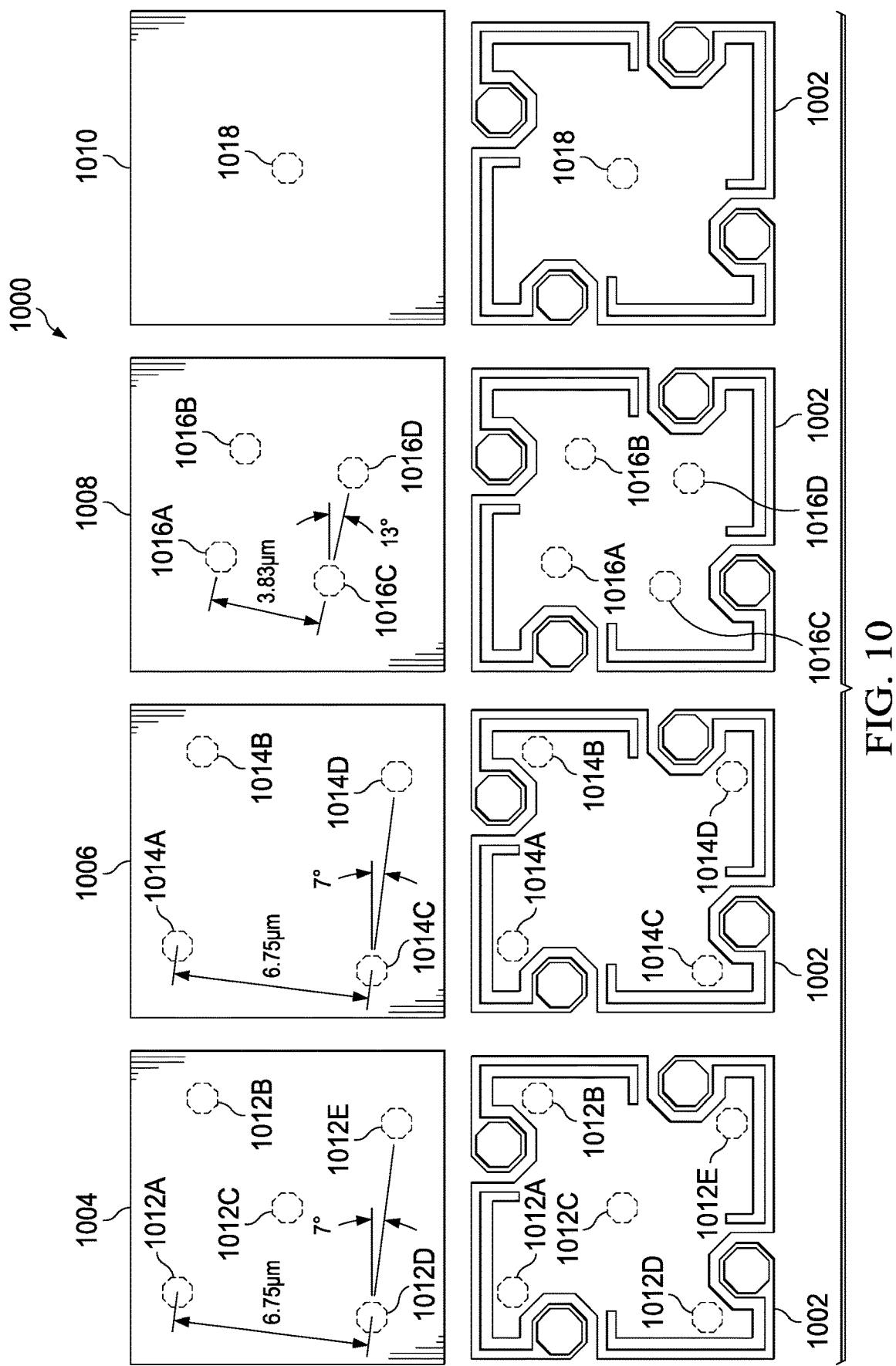
FIG. 10 shows overhead views of mirror via post configurations in accordance with various examples.

FIG. 10 is a diagram 1000 of mirror via post configurations in accordance with various examples. In this example, mirror via posts for design 160 or offset hinge design 450 are shown. Offset hinge design 1002 is shown at the bottom of diagram 900. Offset hinge design 1002 includes hinges with two 90° turns coupled to an edge of the support posts. Diagram 1000 also includes four different mirror via post configurations 1004, 1006, 1008, and 1010. Mirror via post configuration 1004 includes five mirror via posts 1012A, 1012B, 1012C, 1012D, and 1012E (collectively, mirror via posts 1012) arranged in an X-shaped pattern. In this example, the outer mirror via posts are approximately 6.75 micrometers apart. Compared to mirror via post configuration 904 in FIG. 9, the posts 1012 in mirror via post configuration 1004 are shifted at an angle of approximately 7° from parallel. This shift occurs due to the offset locations of the support posts in offset hinge design 1002, where the support posts are located away from the corners of offset hinge design 1002.

Mirror via post configuration 1006 includes four mirror via posts 1014A, 1014B, 1014C, and 1014D (collectively, mirror via posts 1014) arranged in a square pattern, offset approximately 7° from parallel. In this example, the mirror via posts are approximately 6.75 micrometers apart. Mirror via post configuration 1008 also includes four mirror via posts 1016A, 1016B, 1016C, and 1016D (collectively, mirror via posts 1016) arranged in a square pattern, offset approximately 13° from parallel. In mirror via post configuration 1008, the mirror via posts 1016 are closer together than in mirror via post configuration 1006. In this example, mirror via posts 1016 in mirror via post configuration 1008 are approximately 3.83 micrometers apart. Mirror via post configuration 1010 includes a single via post 1018 located approximately in the center of the mirror.

The features of the different mirror via post configurations described above with respect to FIG. 9 also apply to the configurations in FIG. 10. The different mirror via post configurations may change the way the structures deform after the spacers are removed. Different degrees of flatness may occur across an array of mirrors based on the different mirror via post configurations. Configurations without the mirror via post in the center may allow some extra flexibility of the top plate in some examples. Five mirror via posts may provide the strongest structural coupling between the mirror and hinge layer in some examples. Configurations with fewer mirror via posts may alleviate certain mechanical distortions caused by stress imbalances between the mirror and hinge layer in some examples. Fewer mirror via posts may provide better optical quality in some examples.

Figure 11:
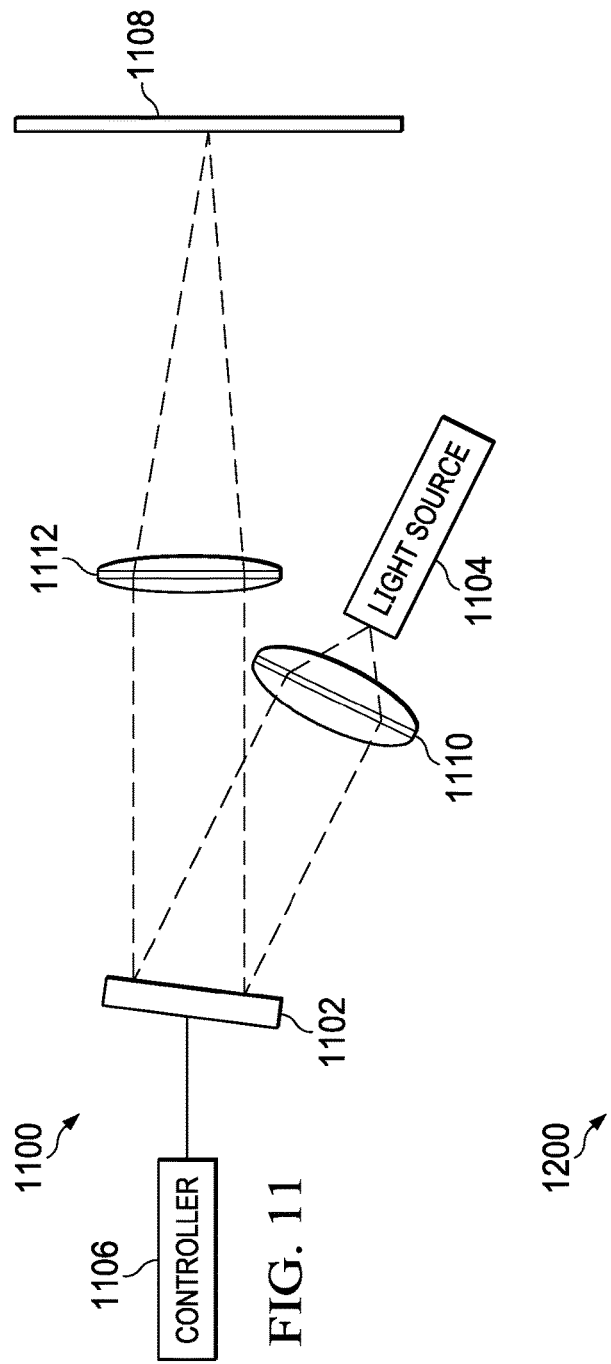
FIG. 11 is a schematic diagram of a system for projecting an image with a PLM in accordance with various examples.

FIG. 11 is a diagram of a system 1100 for projecting an image with a PLM in accordance with various examples herein. System 1100 includes PLM 1102, light source 1104, controller 1106, projection surface 1108, lens 1110, and lens 1112. Lens 1110 and 1112 may each include multiple lenses in some examples. System 1100 may be a projection system for viewing images or video in one example. In another example, system 1100 may be a system for projecting images from an automobile onto a surface outside of the automobile. In another example, system 1100 may be an augmented reality HUD in an automobile. The HUD may display various information to the driver or other passengers in the automobile. System 1100 may be used for automotive headlights in another example.

Light source 1104 is configured to project light through lens 1110 to PLM 1102. Light source may be a laser in one example. A different light source may be used in other examples. Controller 1106 controls the electrodes of PLM 1102 in the manner described above. Controller 1106 may be any suitable controller or processor that provides the 4-bit address state to each electrode of PLM 1102. Controller 1106 may also be coupled to light source 1104 in some examples, and may control light source 1104. Controller 1106 may control the electrodes of PLM 1102 via an SRAM memory array of the PLM 1102 in one example. Voltages are applied to the 4-bit electrodes of PLM 1102 as described above to create an electrostatic force that moves the micromirrors of PLM 1102. Movement of the micromirrors modulates the light from light source 1104. Modulation of the light from light source 1104 produces images, which may pass through projected lens 1112 to projection surface 1108. In some examples, lens 1112 may be absent. Projection surface 1108 may be a surface inside an automobile, such as a windshield. Projection surface 1108 may be a surface outside of the automobile, such as the ground, in another example.

Figure 12:
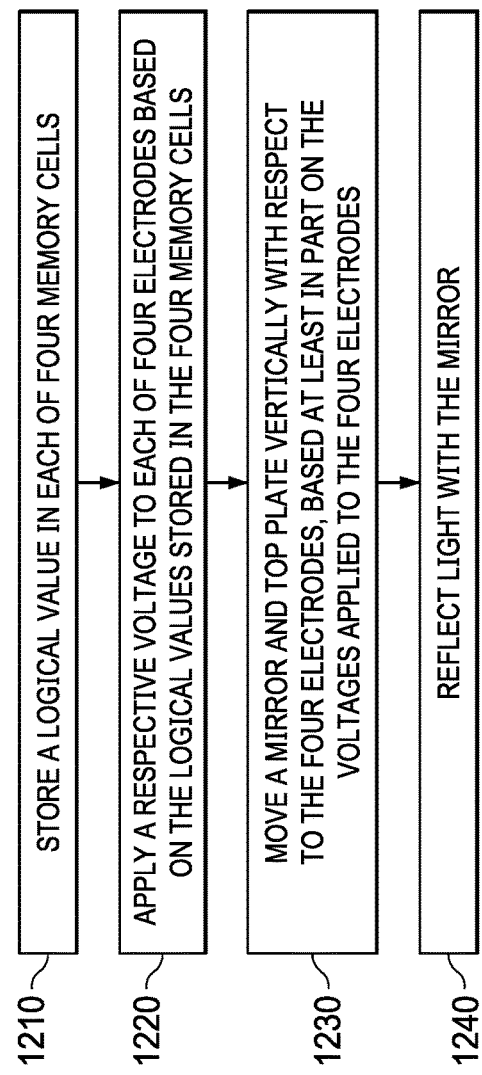
FIG. 12 is a flow diagram of a method for operating a 4-bit PLM in accordance with various examples.

FIG. 12 is a flow diagram of a method 1200 for modulating light with a 4-bit PLM in accordance with various examples herein. The steps of method 1200 may be performed in any suitable order. The hardware components described above with respect to FIGS. 1A, 1B, 2, 5, or 6 may perform method 1200 in some examples.

Method 1200 begins at 1210, where a logical value is stored in each of four memory cells. The memory cells may be SRAM memory cells, such as memory cells in base 202 in one example.

Method 1200 continues at 1220, where a respective voltage is applied to each of four electrodes based on the logical values stored in the four memory cells. As described above, a logical 0 stored in the memory cell may cause a voltage of 0 volts to be applied to a respective electrode. A logical 1 stored in the memory cell may cause a voltage greater than 0 volts, such as 10 volts, to be applied to a respective electrode.

Method 1200 continues at 1230, where the mirror and top plate move vertically with respect to the four electrodes, based at least in part on the voltages applied to the four electrodes. High voltage values applied to each of the four electrodes may move the mirror and top plate a relatively large amount vertically, while low voltage values applied to each of the four electrodes may move the mirror and top plate a relatively small amount or not at all compared to the four electrodes.

Method 1200 continues at 1240, where light is reflected with the mirror. An array of mirror may reflect light to produce an image as described above. The vertical position of the mirror with respect to the four electrodes determines the phase of the reflected light.

Some of the examples described herein may provide advantages over 3-bit electrode designs. Hinges are offset relative to the support posts and connect tangentially to the support posts instead of to the center of the support posts. The offset hinges allow more usable electrode area in the region of the layout below the hinge layer. In the offset hinge design with two 90° turns in the hinges, the "wrap-around" geometry of the hinge may create increased hinge compliance and may provide additional relief of hinge stresses for better thermal stability in some examples. The stress relief of this hinge design may lower the impact of residual stresses in the structure and result in a flatter final mirror structure in some examples. The alternate locations for the hinge support posts may also provide improved planarization and a flatter final structure in some examples, as described above with respect to FIG. 7.

The bottom electrode 4-bit design provides 16 address states instead of 8, which increases the number of mirror positions. The electrode geometry described herein with respect to FIG. 8 provides good linearity among the vertical mirror positions in some examples. The bias electrode signal controls the voltage applied to the hinges and mirror and also provides an electrostatic shield that separates each electrode from the electric field of adjacent electrodes. A mapping algorithm may select a subset of the 16 mirror positions to achieve greater linearity in some examples.

Fewer than five mirror via posts may be used in some configurations, which may alleviate certain mechanical distortions caused by stress imbalances between the mirror and hinge layers in some examples. Some process improvements are also realized with examples herein. Spacer 1 thickness may be increased, which increases the allowable maximum displacement of the hinge layer and mirror. The gaps between the electrodes of the bottom electrodes is reduced from 0.35 micrometers to 0.30 micrometers in some examples. The gaps between adjacent mirrors are also reduced from 0.35 micrometers to 0.30 micrometers in some examples, which may increase the fill factor and reduce diffraction losses.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

While certain components may be described herein as being of a particular process technology, these components may be exchanged for components of other process technologies.

Unless otherwise stated, "about," "approximately," or "substantially" preceding a value means +/−10 percent of the stated value. Modifications are possible in the described examples, and other examples are possible within the scope of the claims.

What is claimed is:

1. A device comprising:
   a hinge structure;
   a mirror coupled to the hinge structure; and
   an electrode structure under the hinge structure, wherein the electrode structure comprises:
      a first electrode;
      a second electrode around the first electrode;
      a third electrode around the second electrode;
      a fourth electrode around the third electrode; and
      a fifth electrode around the fourth electrode, the fifth electrode electrically coupled to the hinge structure.

2. The device of claim 1, wherein the electrode structure is coupled to the hinge structure via one or more hinge support posts coupled to the fifth electrode.

3. The device of claim 2, wherein the hinge structure includes a hinge coupled to an outer edge of one of the one or more hinge support posts and to a plate coupled to the mirror.

4. The device of claim 3, wherein the hinge includes two turns.

5. The device of claim 2, wherein each hinge support post is offset from a corner of the hinge structure.

6. The device of claim 1, wherein the electrode structure is coupled to a memory array.

7. A system, comprising:
   a hinge structure comprising:
      four support posts;
      a plate; and
      four hinges, each hinge coupled to an outer portion of a respective support post and to the plate;

a mirror coupled to the hinge structure; and
an electrode structure under the hinge structure.

8. The system of claim 7, further comprising:
memory array coupled to the electrode structure.

9. The system of claim 7, wherein the mirror is coupled to the plate of the hinge structure with one or more mirror via posts.

10. The system of claim 7, wherein the electrode structure includes four electrodes configured to provide sixteen address states for the electrode.

11. The system of claim 10, wherein the electrode structure includes a bias electrode at an edge of the electrode structure.

12. The system of claim 7, wherein the electrode structure is coupled to the hinge structure via the four support posts.

13. A system, comprising:
a phase light modulator, comprising:
  a hinge structure, wherein the hinge structure comprises:
    a plate;
    four support posts; and
    four hinges, each hinge coupled to an outer portion of a respective support post and to the plate;
  a mirror coupled to the hinge structure;
  an electrode structure under the hinge structure; and
a light source configured to direct light towards the phase light modulator, and wherein the phase light modulator is configured to modulate the light.

14. The system of claim 13, wherein the mirror is coupled to the plate of the hinge structure with four mirror via posts.

15. The system of claim 13, wherein the mirror is coupled to the plate of the hinge structure with five mirror via posts.

16. The system of claim 13, wherein the electrode structure includes four electrodes configured to provide sixteen address states for the electrode structure.

17. The system of claim 16, wherein the four electrodes include:
a first electrode;
a second electrode around the first electrode;
a third electrode around the second electrode; and
a fourth electrode around the third electrode.

18. The system of claim 13, wherein the electrode structure is coupled to the hinge structure via the four support posts.

19. The system of claim 14, wherein the electrode structure includes a bias electrode at an edge of the electrode structure.

20. The system of claim 7, wherein a first hinge of the four hinges is coupled to an outer edge of a first support post of the four support posts, the first hinge extends along an outer edge of the hinge structure, and the first hinge bends to contact the plate.

21. The system of claim 20, wherein the four support posts are offset from corners of the hinge structure, wherein the first hinge bends at a corner of the hinge structure.

* * * * *